United States Patent [19]
Kopecky

[11] 4,417,530
[45] Nov. 29, 1983

[54] PLANTING APPARATUS

[75] Inventor: Ivyl D. Kopecky, Ypsilanti, N. Dak.

[73] Assignee: Haybuster Manufacturing, Inc., Jamestown, N. Dak.

[21] Appl. No.: 348,588

[22] Filed: Feb. 12, 1982

Related U.S. Application Data

[63] Continuation-in-part of Ser. No. 184,664, Sep. 8, 1980, abandoned.

[51] Int. Cl.³ ............................................. A01C 5/00
[52] U.S. Cl. ....................................... 111/73; 111/86
[58] Field of Search .................. 111/73, 80, 86, 66, 111/7, 34, 85; 172/261, 264, 265, 705, 710

[56] References Cited

U.S. PATENT DOCUMENTS

| 909,991 | 1/1909 | Cole | 111/85 |
|---|---|---|---|
| 1,473,297 | 11/1923 | Knight | 111/86 |
| 2,048,331 | 7/1936 | Feltman | 111/59 |
| 2,315,204 | 3/1943 | Holle | 111/86 |
| 2,713,836 | 7/1955 | Ajero | 111/80 |
| 2,889,788 | 6/1959 | Van Dorn | 111/85 X |
| 2,924,189 | 2/1960 | McLeod | 111/80 |
| 3,122,111 | 2/1964 | Taylor, Sr. | 111/80 |
| 3,797,418 | 3/1974 | Bridger | 111/85 X |
| 4,077,478 | 3/1978 | Neukom | 172/267 |

FOREIGN PATENT DOCUMENTS

| 635406 | 1/1962 | Canada | 172/264 |
|---|---|---|---|
| 2016756 | 6/1978 | Fed. Rep. of Germany | 111/80 |
| 1520055 | 2/1968 | France | 111/80 |
| 2379974 | 10/1978 | France | 172/710 |
| 522848 | 4/1955 | Italy | 111/86 |
| 873241 | 7/1961 | United Kingdom | 172/705 |

Primary Examiner—James R. Feyrer
Attorney, Agent, or Firm—Kinney, Lange, Braddock, Westman and Fairbairn

[57] ABSTRACT

A device for planting seed and applying fertilizer including a frame adapted to be moved over the ground and a furrow opener shank carried on the frame. A first delivery tube is provided in the shank for fertilizer and has a lower end disposed to a first predetermined level below the ground. A second delivery tube for seed is also provided and has a lower end disposed at a second predetermined shallower level. The second tube is positioned behind the first tube with respect to the direction of travel. Earth tends to fill in around the fertilizer as the shank moves along. This provides an earth seed bed which separates the seed from the fertilizer. A packer wheel is attached to the frame and trails the second tube of each shank. The packer wheel compacts the ground after delivery of the material to the ground and also regulates the depth of the shank.

5 Claims, 9 Drawing Figures

PLANTING APPARATUS

--CROSS REFERENCE TO RELATED APPLICATION

This application is a continuation-in-part of my co-pending application Ser. No. 184,664, filed Sept. 8, 1980 for PLANTING APPARATUS, now abandoned.

BACKGROUND OF THE INVENTION

1. Field of the Invention

The present invention relates to a seed and fertilizer applying mechanism.

2. Description of the Prior Art

In the prior art, various planting and fertilizer mechanisms have been advanced. These include, generally, individual furrow openers that receive both the seed and the fertilizer together which are dropped together in a row. Also, individually depth controllable furrow openers are known in the art, for example those shown in U.S. Pat. No. 4,077,478.

Recent studies have shown that it is desirable to keep the seed spaced from the fertilizer, preferably above the fertilizer, so that as the plants grow the roots will go toward the fertilizer using only a single furrow opener and accomplishing this placement of material provides an accurate and technically advanced planting apparatus.

SUMMARY OF THE INVENTION

The present invention relates to a device for planting material beneath the ground which includes a frame and a furrow opener shank having a first delivery tube with its lower end at a first predetermined depth. A second delivery tube is also included on the same shank and has a lower end disposed at a second predetermined depth less than the first depth. The second tube is positioned behind the first tube with respect to the direction of travel. The seed and fertilizer metering mechanisms in the shank are connected to the tubes to deliver material through the shank to the first and second depths. Packing means are attached to the frame trailing the shank positioned to compact the ground.

During the operation of the present invention the shank point or opener forms a furrow which permits placement of the fertilizer at a first depth, for example, four inches below the soil surface. Loose soil flows into the furrow behind the outlet opening for the first tube ahead of the outlet of the second tube covering the fertilizer and leaving a seed bed approximately one and one-half to two inches above the fertilizer. Seeds are discharged from the second or trailing tube and drop on the seed bed formed by the soil which has covered the fertilizer. Loose soil flows in behind the shank over the seed. The packing wheel which trails the second tube performs three functions. First, it firms the soil around the seeds behind the seed tube leaving approximately one and one-half to two inches of soil over the seeds. Secondly, it acts as a gauge wheel to control the depth of placement of the fertilizer and seed through linkage connecting the wheel to the shank and the shank to the support frame. Thirdly, at higher speed, the turning packer wheel shields the furrow and prevents erosion of loose soil from laterally adjacent shanks onto the furrow that is formed.

In the preferred embodiment, the shank is mounted to float or trip to clear obstructions which are normally encountered in the field, such as rocks and the like. Since the time that the planting tubes are out of the ground should be minimized to maximize production in the field, minor obstructions are compensated for by a first float action which allows the tube to pass over the small obstruction and quickly return to the position in the soil as controlled by the packing wheel. For major obstructions, the supporting structure trips and moves to permit clearance of the larger objects.

In the preferred embodiment, the discharge passage for the seed is split into two outlet tubes and the outlet tubes randomly direct the metered seeds into one of the other of these two outlet tubes. The outlet tubes diverge in rearward direction so that the outlet ports of the two diverging outlet tubes are spaced apart where the seeds are dropped into the furrow made by the opener point. This insures that not only will the fertilizer be below the seed, but the seed will be placed in rows laterally off to the side of the fertilizer band to place the seed in areas where soil and moisture conditions are more conducive to growth.

The depth control packer wheel has sufficient width to cover the seeds after loose soil has flowed in around the fertilizer and around the seeds. The seeds will be placed at a substantially uniform depth but spaced apart slightly with the fertilizer in between and below the seeds so that as the plants grow the roots will tend to migrate out toward the fertilizer. The seed metering is done by metering the overall amount of seed being fed. The diverging outlet tubes form dividers, with a divider edge between the inlet ends of the tubes so that the seeds randomly go into one outlet tube or another. Approximately 50% of the seeds go out each of the outlet tubes.

The packing means includes a packing wheel or gauge wheel means mounted on the frame and positioned behind the tubes in ground contacting relationship therewith. Also in the preferred embodiment, the shank carrying the first and second tubes is mounted with linkage that permits regulating the pitch angle of the furrow opener and shank to change the relative vertical spacing between the outlets of the first and second tubes. The packing wheel is adjustably mounted to regulate the depth of penetration of the furrow opener.

DETAILED DESCRIPTION OF THE PREFERRED EMBODIMENTS

Figure 1:
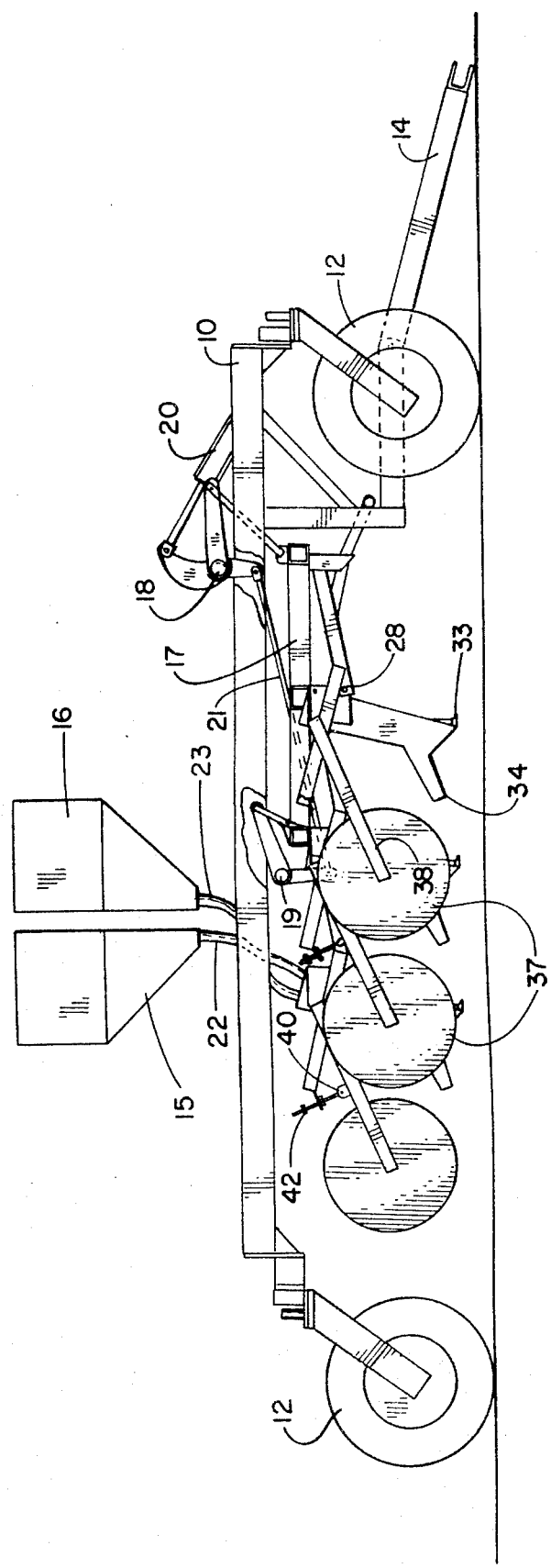
FIG. 1 is a partial schematic side elevational view of a support frame having three planting devices made according to the present invention.

As shown in FIG. 1, a frame such as a tool bar frame comprising a drill assembly 10 is supported conventionally by wheels 12 and drawn by a tongue 14. A fertilizer compartment 15 and a seed compartment 16 are mounted on the frame and provide supply hoppers for the materials to be planted beneath the ground surface. Suitable metering devices are used for metering the seed and fertilizer from the supply hoppers.

A subframe 17 is supported on the main frame of the drill assembly by shafts 18 and 19 which form rock shafts rotatably mounted on the main frame. A hydraulic cylinder 20 is connected to rotate shaft 18 through a control arm. A link 21 simultaneously causes shaft 19 to rotate. Suitable links connected to lift arms on the shafts 18 and 19 permit the subframe to be raised or lowered as desired from a fully up carrying position to a fully down operating position. The links are arranged to keep the subframe 17 substantially parallel to its original position as it is raised and lowered.

The hoppers or compartments 15 and 16 are mounted on the main frame, and flexible feed tubes 22 and 23 transfer metered fertilizer and seed from the hoppers 15 and 16.

Figure 2:
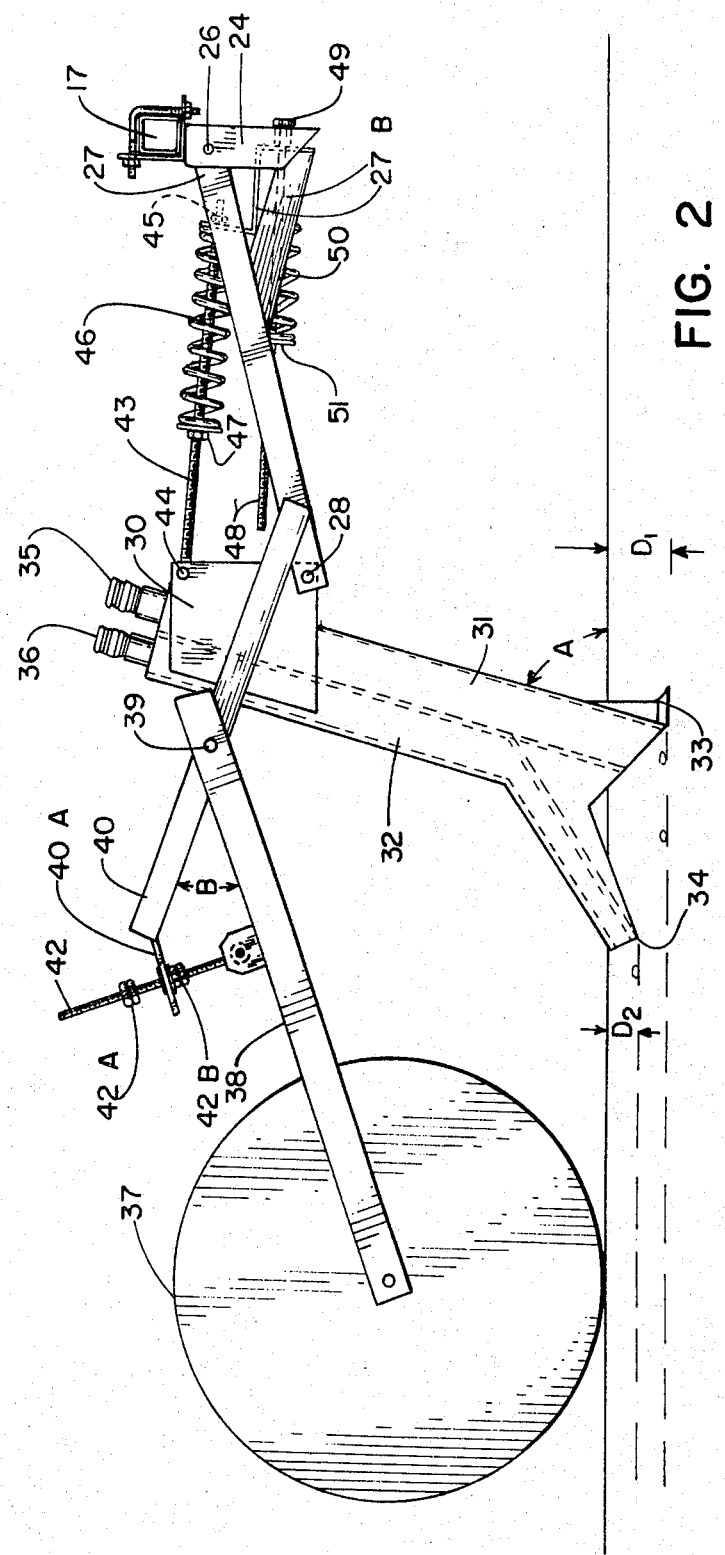
FIG. 2 is a side elevational view of a planting device of the present invention showing normal operation in contact with the soil

The device of the present invention is mounted on the subframe 17 and includes a first support member 24 fixed to and extending down from the subframe 17 as shown in FIG. 2. First support member 24 has a pivot 26 operably connecting the first support member with a shank beam 27. The shank beam 27 comprises two spaced straps held together in an assembly. A furrow opener shank 30 is connected to the rear of shank beam 27 at a shank pivot 28. The shank 30 is vertically elongated and made up of a first tube section 31 and a second tube section 32 which extend downwardly. The shank 30 is connected to the shank beam 27 through a pair of plates 30A which are fixed to the shank on opposite sides thereof. The tubular shank is provided with a narrow or sharp leading edge, and the shank tapers outwardly in rearward direction. At the shank lower end and at the leading corner, a spear point 33 is mounted to penetrate the soil. The spear point 33 is positioned at a predetermined distance $D_1$ below the ground. Second tube section 32 in the shank, which is positioned behind tube section 31 with respect to the direction of travel, has an outlet sleeve 34 which extends a distance behind the opening from the tube section 31 and which is a distance $D_2$ below the soil surface. In conventional planting, distance $D_1$ can be about four inches, and distance $D_2$ about two inches.

The tube 35 is connected to feed tube 22 and fertilizer hopper 15, while a feed tube 36 is connected via feed tube 23 to seed hopper 16. As illustrated in FIG. 2, the fertilizer, which can be either liquid or solid, passes through tube section 31 and out the bottom outlet opening of the tube section a distance $D_1$ below the ground. As the shank passes through the ground, soil which is moved aside by movement of the shank and the spear point backfills or fills in behind the furrow made by the point 33. A recessed area is provided in the lower portion of the shank immediately behind the outlet opening from tube section 31 to permit the soil to fill in around the fertilizer dropped into the furrow.

Seed, which has been metered, passes through the tube section 32 and through the outlet opening of the sleeve 34 which is the distance $D_2$ below the ground. The seed is dropped on the soil which has filled in around the fertilizer. Again, soil will fill in behind the furrow made by the sleeve 34. The outlets of tube section 31 and sleeve 34 are separated by a horizontal distance which is sufficient to permit the soil to fill in behind the first tube section at normal delivery speeds.

A gauge-packing wheel 37 is provided to follow behind the furrow made by a spear point 33, and the shank 30, and pack the soil to a depth of approximately one and one-half to two inches under normal conditions. A slight depression is left by the wheel. The packing wheel 37 is mounted on a beam portion 38 which is pivoted as at 39 to a rearwardly extending portion 40 of the shank beam 27. The rearwardly extending portion 40 is fixedly mounted to the forward parts of the shank beam 27. A threaded adjustment rod 42 is connected to beam 38 and extends through a tab 40A fixed to beam portion 40.

The rod 40 has a pair of lock nuts 42A above the tab 40A and a pair of lock nuts 42B below the tab. The lock nuts 42B limit the upward movement of the beam 38 relative to the tab 40A and beam 40. The lock nuts 42A thus control the depth of the shank relative to the ground as the gauge wheel 37 engages the ground. As will be explained, the beam 27 is yieldably mounted to permit this depth control. Spring mounting is provided to stabilize the position of the shank 30 with respect to the shank beam 27, since they are pivotally mounted together at shank pivot 28. A spring rod 43 is also slidably mounted through an opening in a reaction plate 45 which is fixed to beam 27 (between the side members). The end of rod 43 extending forwardly of plate 45 has an adjustment nut 45A threaded on the rod, which may be threaded to control the fore and aft location of the pivot bar 44 (which pivots between plates 30A) relative to plate 45.

A biasing spring 46 is mounted over spring rod 43 and bears against plate 45. A threaded nut 47 is also mounted on rod 43 at an opposite end of the spring 46 from plate 45, and is adjustable to adjust the force exerted by the spring 46 tending to move shank 30 counterclockwise about pivot 28.

Similarly, the relationship between the shank beam 27 and the first support member 24 about pivot 26 is controlled by a biasing spring 50 mounted on a threaded rod 48. The threaded rod 48 passes through an opening in a cross plate 24A of first support member 24.

The shank beam 27 also has a cross member 27A which is suitably supported on a frame 27B on beam 27 parallel to the cross plate 24A. Rod 48 extends through a spacer 48A between plates 24A and 27A. The spring 50 is positioned on the opposite side of the cross member 27A from plate 24A. The spring urges member 27A toward plate 24A under a spring force variable by adjusting a nut and washer 51 mounted on rod 48. The rod 48 has a head 49 which prevents the rod from passing through plate 24A so the force from spring 50 urges the shank beam counterclockwise about pivot 26.

The angle A formed between the soil surface and the front edge of the shank 30 is controlled by adjusting nut 45A along rod 43. The bias spring 46 will normally keep the nut 45A tight against plate 45 and thus by adjusting nut 45A the shank angle about pivot 28 may be changed. This angular change will permit adjusting the angle of point 33 and at the same time the vertical distance between the lower opening of tube section 31 and the outlet of sleeve 34 will be changed because of the horizontal spacing of the two outlets. For example, tilting the upper part of the shank further forwardly will raise the outlet of sleeve 34 relative to the outlet of tube section 31.

The force of spring 46 resisting pivoting of the shank in clockwise direction is controlled by adjusting nut 47.

The control of depth of the shank is accomplished by the gauge wheel 37 as explained. The individual shank beam is permitted to float about pivot 26 under control of spring 50. By adjusting the nut 51 the force with which the shank beam resists upward movement can be adjusted. The spring 50 is a compression spring and urges the shank beam counterclockwise about pivot 26 as viewed in FIG. 2.

Figure 3:
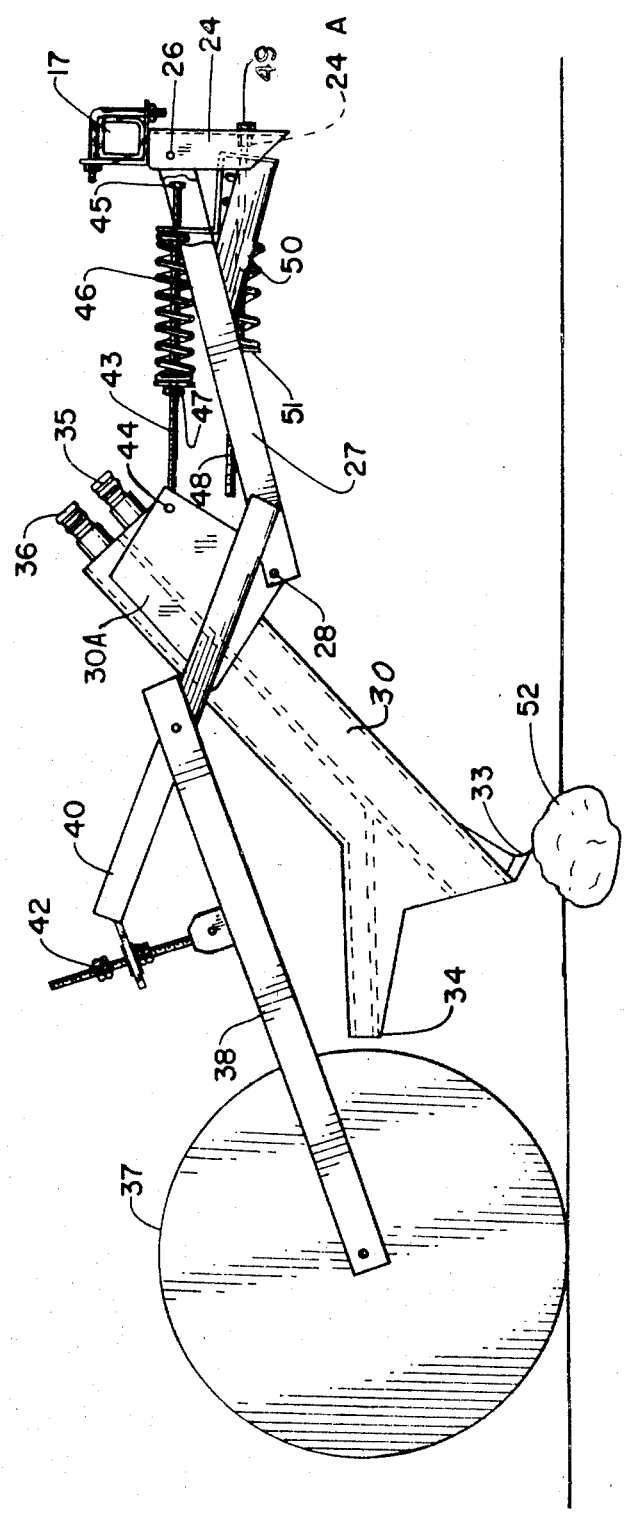
FIGS. 3 and 4 are side elevational views of the planting device of FIG. 2 shown in contact with relative sized obstructions found in the field.

In the operation of the present invention, occasionally relatively small objects such as rocks are encountered in the field as shown in FIG. 3. As the rock 52 is hit by point 33, pivot 28 permits movement of the shank 30 with respect to the beam 27 about pivot 28 by compressing spring 46. After clearing the obstruction 52, spring 46 resets point 33 in the soil.

Figure 4:
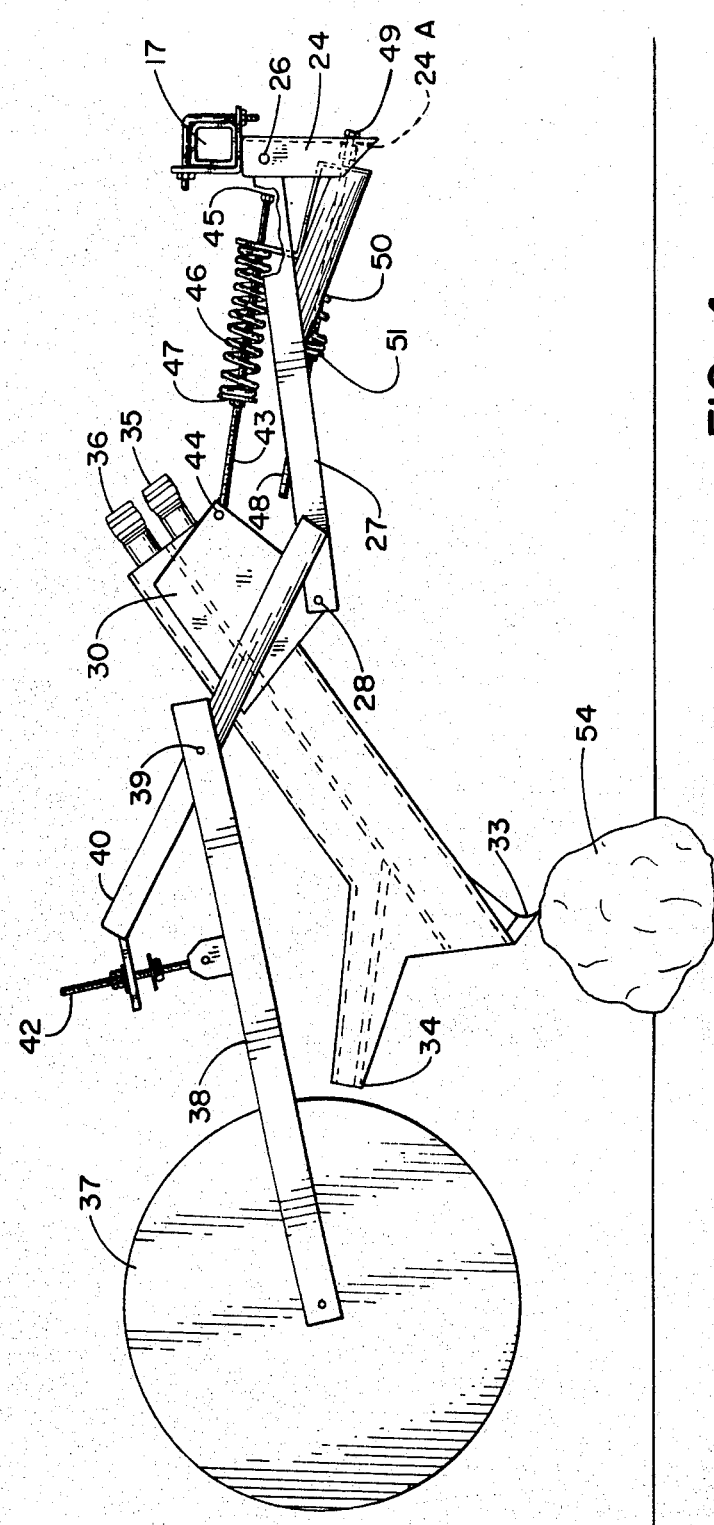
Figure 5:
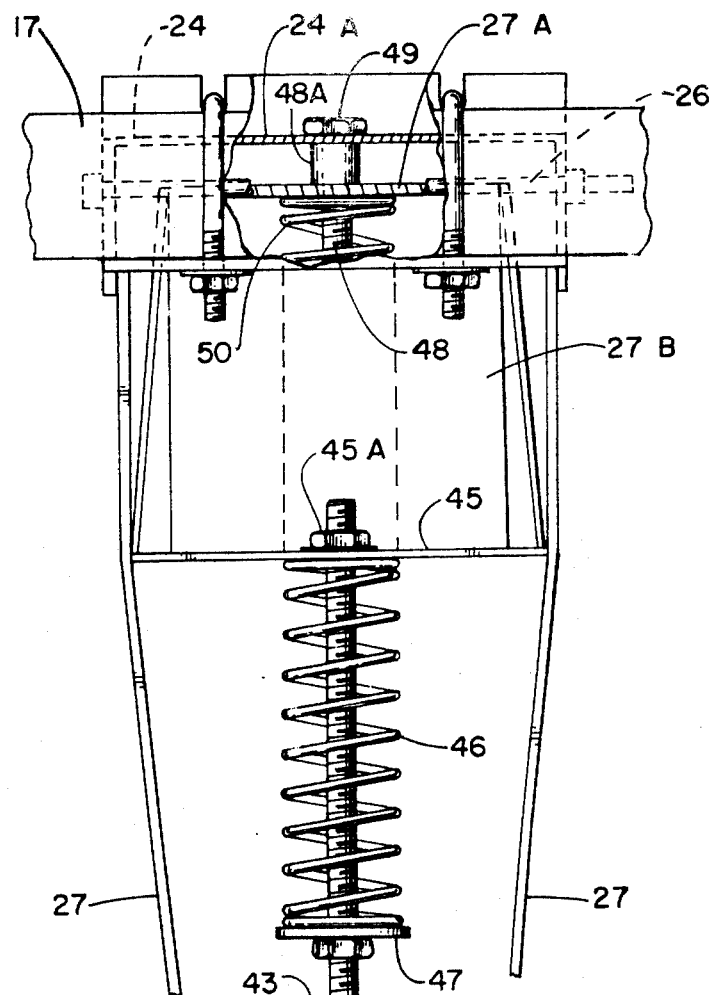
FIG. 5 is a top plan view of the shank frame for a planting device of the present invention.
Figure 6:
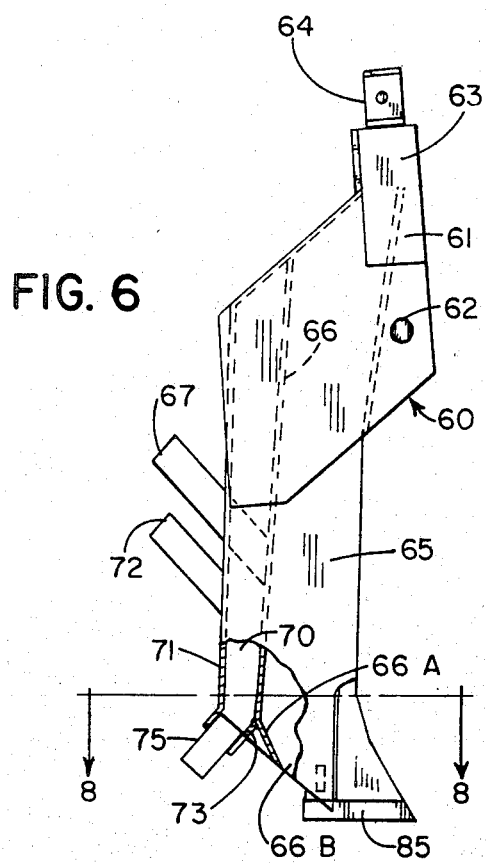
FIG. 6 is a side elevational view of a planting device of the present invention having a seed distribution shank of a modified form.

In FIG. 4, the effect of encountering a larger rock 54 is shown. Not only will spring 46 compress as described, but as the force on the lower part of the shank increases, the shank beam 27 pivots about pivot 26 and cross member 27A moves away from plate 24A to compress spring 50. As point 33 clears the obstruction 54 springs 46 and 50 return the device to its normal operating position. As was shown in FIG. 1, more than one device can be carried by a single subframe 17. Since each device is individually spring mounted about its pivot 26, the depth of each unit is determined by its packing wheel 37. Adjustment of the depth $D_1$ and therefore $D_2$ can be accomplished by lock nuts 42B. Angle A that is made by the shank tube 31 with respect to the soil level can be varied by changing the position of nut 45 on shaft 43.

The placement of the fertilizer in vertically spaced location from the seed and separating the seed from the fertilizer with soil provides for an optimum relationship for plant germination and growth. One benefit in drier ground is that the point 33 is more likely to engage moist soil (because it is deep) and this deeper soil is what fills in behind and over the fertilizer. The seed is thus dropped onto soil which is likely to be moist to thereby enhance germination.

Also, in dry conditions in particular, the roots will tend to grow toward the fertilizer or plant food. The downward growing roots initiate a strong root system that will sustain the plant in dry conditions. The root system does not therefore tend to remain on the surface of the ground.

The unit also is well suited for minimum tillage or "no till" farming. The shanks can be made to penetrate the soil with little disruption of the soil surface. The moisture present when seeding is preserved and utilized for maximum germination and plant growth.

It should also be noted that in effect a first furrow or ground opening is formed by the spear point for the leading tube section and the trailer tube section 34 forms a second furrow in the loose dirt that has filled in over the fertilizer. Thus, effectively two ground openings or trenches at two depths are maintained.

A second preferred embodiment shown in FIGS. 6 through 9 comprises a shank assembly 60 that has a pair of side plates 61, 61. The side plates are in turn used for supporting a pivot pin 62 that corresponds to the pivot 28, and which attaches to the shank beam 27 in the same manner as previously explained in relation to the first form of the invention. The side plates 61 further carry a spring reaction assembly indicated generally at 63 that has a connector 64 that provides for the pivot 44 to connect to the spring rod 43 in the same manner as that shown in the first form of the invention, and therefore the benefits of adjustment, "float" and other features described would be available with the shank assembly 60, as well as with the shank assembly 30.

The shank assembly 60 is a tubular shank as in the first form of the invention, and includes a first tubular section indicated generally at 65 that has a relatively narrow leading edge as in the first form of the invention, and a wall indicated at 66 that forms the rear wall of the first tubular section. The wall 66 has a lower, forwardly inclined wall portion 66A which defines the rear side of an outlet opening indicated at 66B. The rear wall 66 also has a connector tube 67 joined thereto and opening through the wall and extending upwardly at the rear portions of the shank assembly and tube 67 is the tube for receiving metered fertilizer. In the first form of the invention such a tube is shown at 35 at the top of the shank, but in this case the tube 67 extends rearwardly and is adapted to be attached to a flexible tube leading from the fertilizer metering assembly.

A second tubular shank section indicated generally at 70 is to the rear of the wall 66 and thus to the rear of the first tubular section 65 the second tubular shank section is defined between the side walls of the shank assembly 60 and a rear wall 71. This second section 70 comprises the seed delivery tube in the shank assembly 60 and has an inlet connector tube 72 joined to the rear wall 71, which receives metered seed therethrough.

Figure 8:
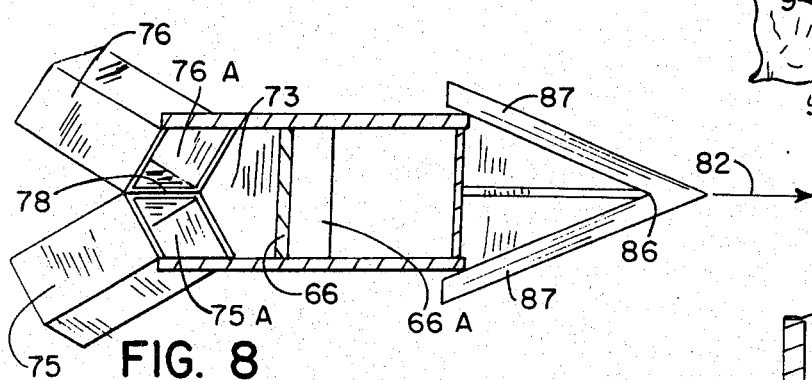
FIG. 8 is a sectional view taken as on line 8—8 in FIG. 6.
Figure 9:
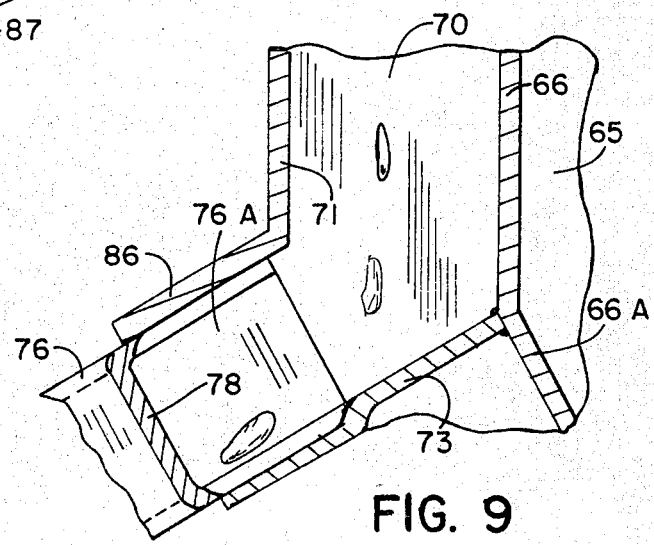
FIG. 9 is an enlarged sectional view showing the junction between the inlet openings of individual seed delivery tubes that serves to divide the seed into two portions that are separated out laterally from the center of the unit.

At the lower end of the tube section 70, a guide wall 73 inclines rearwardly and downwardly, and is joined to the lower portion of the wall 66 as shown. Additionally, a pair of diverging (in rearward direction) seed delivery or outlet tubes 75 and 76, respectively, are connected so that they have inlet ports or openings indicated at 75A and 76A that are open into the tube 70. Tubes 75 and 76 are made so that their adjacent walls form a substantially sharp divider edge indicated at 78 in FIG. 9. A closing wall 80 is provided at the upper sides of the outlet tubes 75 and 76 where they join together, and thus any seed delivered through the tube 72 and falling down through the lower portion of the tubular section 70 will strike the plate or wall 73 and flow downwardly and rearwardly and be divided by the edge 78 between the two outlet tubes 75 and 76. Part of the seed then will be delivered out the outlet opening 75B of tube 75, and part of the seed will be delivered out through the outlet opening 76B of the tube 76. It can be seen that the outlet openings or ports 75B and 76B are spaced apart laterally with respect to the normal direction of travel of the shank, which direction is indicated in FIG. 8 at 82.

Figure 7:
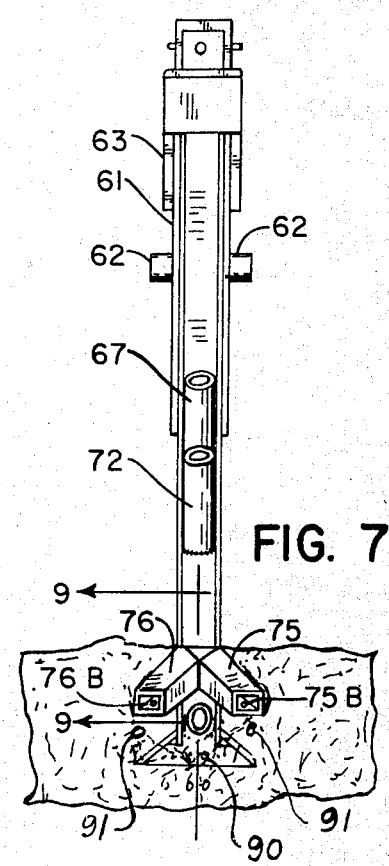
FIG. 7 is a rear view of the device of FIG. 6.

The shank assembly 60 further includes a spear point or shoe 85, having a pointed leading edge 86, and diverging blade members 87 that are spaced at their rearward ends a sufficient amount to provide a formed furrow for permitting the depositing of the fertilizer and seed as described in the first form of the invention. In FIGS. 7 and 8, in particular, it can be seen that these shoes, when traveling under the ground, will separate the ground to form a furrow, and the fertilizer (shown at 90) will drop down into the base of the furrow immediately behind the spear point 85 which is maximum depth. The sides of the blade members 87 of the spear point taper upwardly to the rear and thus the outer edges are at a slightly higher level than the leading point. The seed coming out of the output ports 75B and 76B (shown at 91) will be deposited along the sides of the furrow formed by the blade members 87 at a higher level, and soil that falls in behind the spear point will also cover the fertilizer. The seed then will be deposited on a relatively firm seed bed formed by the spear point and also will be spaced laterally from the deposited fertilizer and above it.

This greatly enhances the germination rate, particularly in relatively dry conditions, because the spear point provides for a firm bed in relatively moist soil. The split outlets are not dependent entirely upon the closure of loose soil over the fertilizer for forming the seed bed. Loose soil many times is the drier top soil that falls in the furrow. With the spear points made according to the present invention, not only will the spear points be forming a relatively firm seed bed as the bottom edges of blades 81 slide along, but also the outlet tubes 75 and 76 will tend to divide the furrow as shown in FIG. 7, to keep the side walls of the furrow open so that as the seed drops out the outlet ports it will be immediately covered with relatively moist soil to aid in germination.

In the second form of the invention, the same type of mounting assembly can be used for the shank assembly 60, that is, the shank beam 27 can be utilized for mounting and adjustment so that the relative depth of penetration of the spear point leading end can be changed, and the outlet ports 75B and 76B of tubes 75 and 76 for discharging the seed can be raised relative to the discharge point of the fertilizer. The division of the seed into separate outlet tubes provides for two separate streams or lines of randomly divided seeds from a metered source. Each line of seed is placed adjacent the edges of the furrow formed by the spear point or furrow opener 85, and this increases germination opportunities and therefore yields. The fertilizer is between the seed lines or rows and below them. Soil will fill in around the fertilizer and cover it as soon as it is dropped. The seeds then drop on the side of the filled in soil on surfaces that have been firmed up by the shovel that opens the furrow. The roots of the plants seeded will tend to go down and sideways to provide a firm root network as the roots seek out the fertilizer that is deposited.

The packer wheel of each planter unit will cover the seeds and firm and pack the soil into the furrow. The width of the packer wheel 37 can be selected so that it will correspond to the width necessary for covering the two streams or lines of seeds satisfactorily, and will provide adequate support for depth control It is should be noted that the spear point is provided with a gusset at the forward edge for permitting the shank to include more than that which is shown in FIGS. 6 through 9 if desired and of course any type of spear point or opening shovel that provides the necessary opening can be utilized.

The spear point or opener must open a furrow which will be adequate in width to provide space to drop in the fertilizer in the center of the furrow, preferably at a first depth, and to drop two rows of seeds which are spaced on the opposite sides of the row of fertilizer and preferably at a second depth, less than the depth of the fertilizer.

What is claimed is:

1. A planting apparatus comprising:

a shank assembly having a housing defining a pair of upright tubular sections, a first of said sections having an outlet at the lower end generally centered on the shank assembly and at a first predetermined depth when the shank assembly is in a working position;

a spear point having a center portion and laterally extending wing portions, the center portion opening a furrow of maximum depth;

means to provide a granular fertilizer material to said first tubular section for depositing the fertilizer in the ground generally centered on the shank and directly behind the center portion of the spear point;

a pair of tubes mounted on the housing having first ends opening into the second tubular section adjacent the lower end of the second tubular section, the first ends of said tubes being adjacent each other and the tubes diverging outwardly and downwardly from the shank assembly housing in rearward direction, second ends of said tubes being spaced apart laterally and terminating rearwardly of the housing and forming outlet ports at a level above the center portion of the spear point and deposited fertilizer and above and behind the lateral portions of the spear point, the tubes having solid walls that diverge sideways in rearward direction and which tend to divide the furrow to be wider than the housing immediately ahead of the outlet ports;

means to provide seed grain to said second tubular section; and guide wall means for guiding the seed grain from the second tubular section into the two tubes and dividing the seed grain from said second tubular section into two portions, one of which portions is provided to one of the pair of tubes, and the other of which portions is provided to the other of the pair of tubes.

2. The planting apparatus of claim 1 wherein said housing comprises a generally rectlinear cross sectional configuration, and the first and second tubular sections are formed by a vertically extending wall dividing the housing into two chambers.

3. The planting apparatus of claim 1 wherein connection conduits are mounted on and extend to the rear of said housing above the lower end thereof, one of said connection conduits passing from the rear of the housing completely through said second tubular section to open into said first tubular section.

4. The planting apparatus of claim 1 wherein the guide wall means includes edge portions of the pair of tubes being adjacent each other at the first ends which open into the second tubular section, the edge portions of the pair of tubes at the first ends thereof forming the means to divide the material into two portions.

5. The planting apparatus of claim 1 and means to permit mounting the shank assembly to a support beam.

* * * * *